Figure 1:
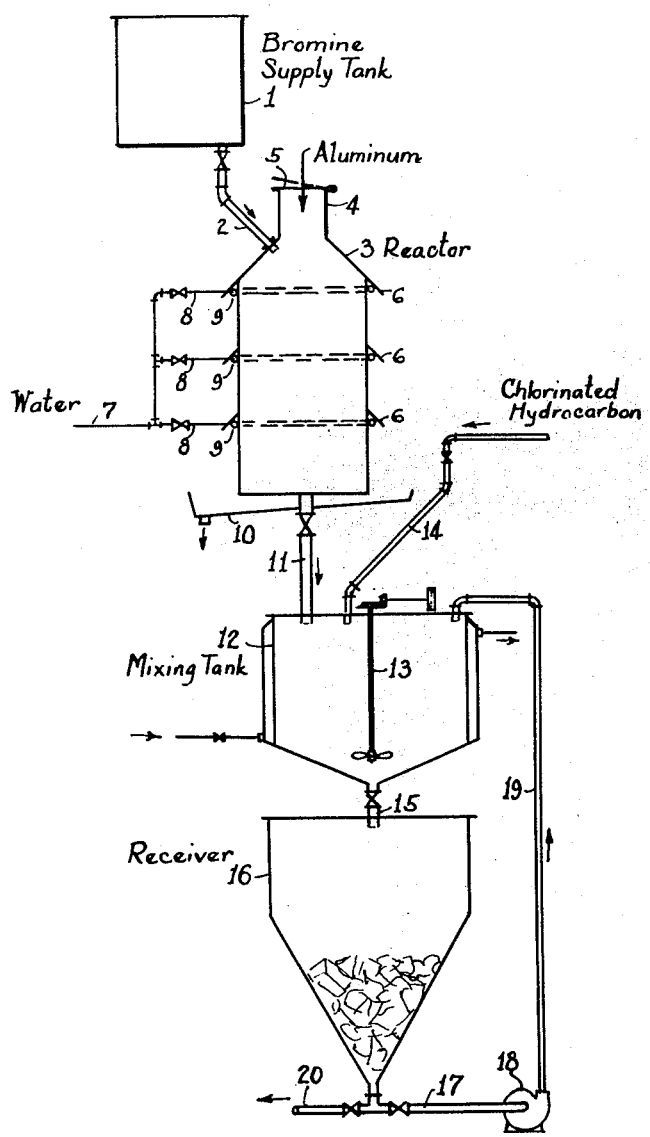

Patented Dec. 20, 1932

1,891,415

UNITED STATES PATENT OFFICE

IVAN F. HARLOW AND OTTO C. ROSS, OF MIDLAND, MICHIGAN, ASSIGNORS TO THE DOW CHEMICAL COMPANY, OF MIDLAND, MICHIGAN, A CORPORATION OF MICHIGAN

PREPARATION OF BROMINATED HYDROCARBONS

Application filed April 9, 1930. Serial No. 442,983.

This invention relates to the preparation of bromo-substituted hydrocarbons by substitution of bromine for chlorine in the corresponding chlor-compounds through the agency of anhydrous aluminum bromide, and has particular regard to the preparation of brominated aliphatic hydrocarbons, e. g. bromoform, ethylene dibromide and the like.

It is well known that anhydrous aluminum bromide is capable of replacing chlorine by bromine in chlorinated aliphatic hydrocarbons, according to the general equation;

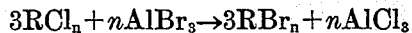

wherein R represents an aliphatic radical and $n$ the number of chlorine atoms contained therein. (Cf. Comptes Rendus 130; 1191 (1900)). As heretofore carried out, however, the method has involved certain practical operating difficulties which are of material consequence as regards the commercial production of compounds of the class in hand. It has been the practice to react solid anhydrous aluminum bromide in granular or other divided form with the chlorinated hydrocarbon. Such procedure is simple and direct, but suffers from the disadvantage that anhydrous aluminum bromide, due to its very great affinity for moisture, is exceedingly difficult to prepare in a finely divided condition by crushing, grinding or similar means, and is equally difficult to store or handle without deterioration due to the rapidity with which it absorbs water from the atmosphere.

We have now succeeded in obviating all such difficulties and inconveniences in carrying out reactions of the present character by preparing the anhydrous aluminum bromide in molten condition and introducing the molten salt directly into the body of chlorinated hydrocarbon with suitable temperature control in accordance with the improved procedure hereinafter described in detail. The invention, then, consists in the novel combination of steps constituting our improved process which will now be fully set forth in the annexed drawing and following description, and particularly pointed out in the claims.

In said annexed drawing:—

The single figure is a diagrammatic representation of an apparatus arrangement suitable for carrying out the process.

The general operation of the process may be illustratively explained by reference to the drawing. Liquid bromine is provided in supply tank 1 from which it is drawn off as required through valve controlled pipe 2 of lead or ceramic material into reactor 3. The latter is a cylindrical steel tank surmounted by a charging inlet 4 closable by means of cover 5. Attached to the exterior wall of reactor 3 is a plurality of downwardly sloping shields or fins 6 dividing the outer surface into an equal number of zones separated from each other. The office of shields 6 is to divert the flow of cooling water supplied to each zone through header 7 and laterals 8 to the perforated coils 9 so that any one or more of such zones may be cooled independently of the others simply by spraying or flowing cooling water over the surface, the water running off the shield and being collected in pan 10 at the base of reactor 3, from which it is run to the sewer.

Reactor 3 is charged with metallic aluminum in any convenient form, such as sheet metal cuttings or the like, and cover 5 tightly closed. Bromine is then introduced from supply tank 1 through pipe 2 so that it comes directly in contact with the aluminum without being permitted to reach the walls of the reactor. The reaction is initiated at once and proceeds with great vigor accompanied by evolution of much heat. The rate of addition of bromine is so regulated that the temperature within the reaction mass is not allowed to rise above about 250° C., cooling water being supplied through perforated coils 9 as required to assist in controlling the temperature. The aluminum bromide formed melts and collects in the lower part of the reactor which is preferably kept at a temperature between about 100° and 250° C., preferably around 125° to 150° C. From time to time additional quantities of aluminum may be added, and the reaction continued until a sufficient amount of molten aluminum bromide has accumulated, care being taken to keep an excess of aluminum always present. With this precaution no free bromine remains within the reactor more than momentarily and there is practically no attack upon the walls of the reactor itself.

When a suitable amount of molten aluminum bromide has been prepared, it is drawn off gradually through a valved outlet 11 into a closed, water-jacketed mixing tank 12 provided with a mechanical stirring device 13 into which a charge of the chlorinated hydrocarbon has been introduced through supply pipe 14, and the two reactants are thoroughly mixed. Cooling water is circulated through the water jacket, and the rate of introduction of aluminum bromide is regulated so as to hold the temperature below about 80° to 90° C., the temperature being in any case advisedly maintained below the boiling point of the chlorinated compound employed. If the temperature is allowed to rise too high, decomposition will occur with the formation of gaseous and carbonaceous products and accompanied by evolution of much heat, so that once the reaction gets out of control the entire batch may be lost. The desired reaction takes place readily within the prescribed temperature limits, resulting in the precipitation of aluminum chloride which forms a sludge or magna. When the consistency of the sludge becomes great enough to interfere with effective stirring of the mixture, further addition of aluminum bromide is stopped and the mixture is discharged through outlet 15 into a conical-bottomed receiver 16 which is partially filled with ice. The aluminum chloride is dissolved by water with considerable evolution of heat, the rate of addition of the sludge being adjusted so that the aqueous mixture always contains ice and hence is kept cool. The aqueous solution forms an upper liquid layer while the mixture of chlorinated and brominated hydrocarbons forms an immiscible lower layer. The latter is drawn off through pipe 17 and returned to mixing tank 12 by means of pump 18 and pipe 19, and the aqueous solution is then discharged through pipe 20. The mixture returned to tank 12 is then treated further with aluminum bromide in the same manner as before until the chlorinated hydrocarbon is completely converted to the brominated compound, which may require one or more repetitions of the original treatment, depending upon the particular compound treated and the consistency of the sludge formed.

When the reaction and separation of aqueous and non-aqueous layers has been completed, the crude reaction product is transferred to a suitable distilling apparatus and purified by distillation, which may be carried out either directly under reduced pressure or by distilling with steam. Usually the latter procedure will be most convenient in the case of compounds having a boiling point above 100° C., the distilled product being then separated by decantation from the water and dried by treatment with a suitable dehydrating agent, such as anhydrous potassium carbonate.

The following examples illustrate various specific applications of our improved process:—

Example 1

Molten aluminum bromide prepared as herein described is gradually added to a body of chloroform, keeping the temperature of the resulting mixture below 60° C. and the reaction product is worked up as aforesaid. By employing a slight excess of the bromide the conversion of chloroform to bromoform is substantially quantitative.

Example 2

By similar procedure, maintaining the reaction temperature preferably below about 50° C., ethylene chlor-bromide, $C_2H_4ClBr$, is converted substantially quantitatively to ethylene dibromide.

The examples just given are not to be understood as implying any limitation upon the invention, which in its broad aspect is applicable to the preparation of brominated aliphatic or aromatic hydrocarbons from the corresponding chlorinated hydrocarbons through transposition of bromine and chlorine by the action of molten anhydrous aluminum bromide under the conditions and in the manner set forth in the preceding description. The process, accordingly, may be employed for preparing carbon tetrabromide from carbon tetrachloride; ethyl bromide from ethyl chloride; ethylene dibromide from ethylene dichloride; acetylene tetrabromide from acetylene tetrachloride; tribromethylene from trochlorethylene; bromobenzene from chlorobenzene, etc. All of the troublesome features attaching to the preparation, storage and handling of anhydrous aluminum bromide in granular form are entirely eliminated by our improved procedure, in addition to which the feeding of materials and control of reaction temperatures are more conveniently managed.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of preparing a brominated hydrocarbon which comprises adding molten aluminum bromide to the corresponding chlorinated hydrocarbon while maintaining the temperature of the reaction mixture below the boiling point of such chlorinated compound.

The method of preparing a brominated hydrocarbon which comprises adding molten aluminum bromide to the corresponding chlorinated hydrocarbon while maintaining the temperature of the reaction mixture below the boiling point of such chlorinated compound, treating the reaction product with ice water and separating the brominated compound from the aqueous solution.

3. The method of preparing bromoform which comprises adding molten aluminum bromide to chloroform while maintaining the temperature of the mixture below 60° C.

4. The method of preparing bromoform which comprises adding molten aluminum bromide to chloroform while maintaining the temperature of the mixture below 60° C., treating the reaction product with ice water and separating the bromoform product from the aqueous solution.

Signed by us this 4th day of April, 1930.

IVAN F. HARLOW.
OTTO C. ROSS.